UNITED STATES PATENT OFFICE.

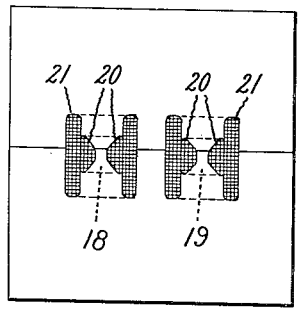
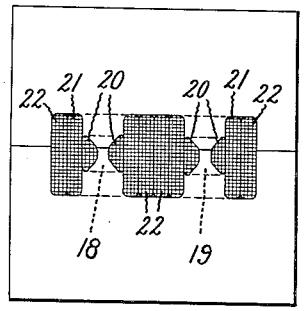
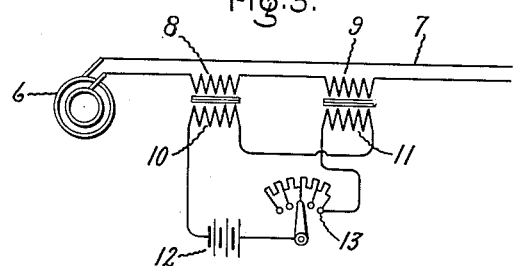
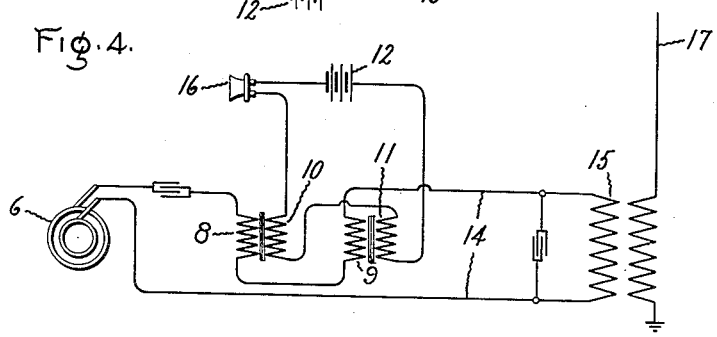
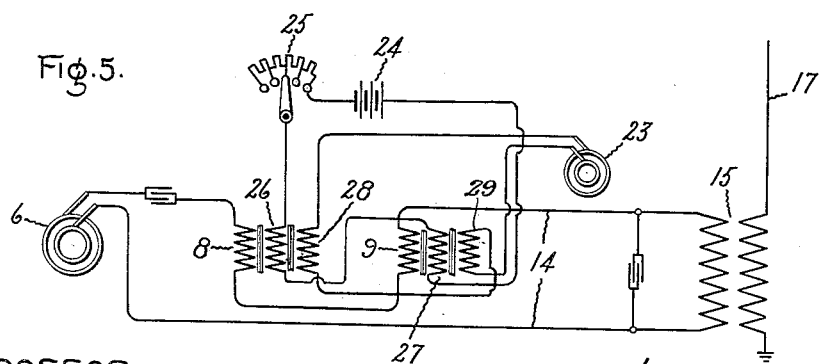

ERNST F. W. ALEXANDERSON, OF SCHENECTADY, NEW YORK, ASSIGNOR TO GENERAL ELECTRIC COMPANY, A CORPORATION OF NEW YORK.

CONTROLLING ALTERNATING CURRENTS.

1,206,643.  Specification of Letters Patent.  Patented Nov. 28, 1916.

Application filed December 7, 1912. Serial No. 735,359.

*To all whom it may concern:*

Be it known that I, ERNST F. W. ALEXANDERSON, a citizen of the United States, residing at Schenectady, county of Schenectady, State of New York, have invented certain new and useful Improvements in Controlling Alternating Currents, of which the following is a specification.

My invention relates to a method of and apparatus for controlling alternating electric currents.

The object of the invention is to provide a novel method of and apparatus for controlling the quantity of alternating current flowing in a circuit, or the output of an alternating current generator.

In accordance with my invention, the quantity of alternating current flowing in a circuit is controlled by an electric current in such a manner that the quantity of alternating current so flowing is proportional to the controlling electric current.

The invention is peculiarly adapted for the amplification of varying electric currents, and in this connection is particularly useful in telephone work, and more especially in wireless telephony.

The novel features which I believe to be characteristic of my invention will be definitely indicated in the claims appended hereto.

The method of operation and the features of construction will be understood by reference to the following description taken in connection with the accompanying drawings which show the preferred embodiments of my invention, and in which:

Figure 1 is an elevation partly in section of an apparatus employed in carrying out my invention; Fig. 2 is a similar view of a modification of such apparatus; Fig. 3 is a diagrammatic view illustrating the principle of operation of my invention; Fig. 4 is a diagrammatic view of the application of my invention to a wireless telephone system, and Fig. 5 is a diagrammatic view of another application of my invention.

My invention consists broadly in controlling the amount of alternating current flowing in a circuit by an impedance whose effective value is determined by a second or controlling current. This second or controlling current may be either alternating or direct, and is independent of the current to be controlled as will more fully appear hereinafter. The impedance is preferably produced by including in the alternating current circuit a reactance coil, such as a choke coil, whose degree of magnetization is determined by the controlling current. The alternating current may be supplied to the circuit by an alternator of the ordinary type. A reactance or choke coil is included in the alternating current circuit and is so wound that its magnetic circuit is magnetized by the controlling current and in such a manner that the latter completely controls the energy in the alternating current circuit.

The principle of my invention will be best understood by reference to Fig. 3 of the drawings. In this figure there is represented diagrammatically an alternator 6 of the ordinary type, supplying current to a circuit 7. Two reactance coils 8 and 9 connected in series are included in this circuit, and in operative relation with these coils are two associated coils or windings 10 and 11 respectively. The coils 10 and 11 are connected in opposition, as indicated in the drawings, and in series with a source of current, such as a battery 12. The magnetizing action of the current flowing in coil 10 upon coil 8 is opposite in effect to that of the current flowing in coil 11 upon coil 9. Furthermore, as coils 10 and 11 are connected in opposition, the voltage induced in coil 10 is opposite to that induced in coil 11. The respective coils are so designed that the voltage induced in coil 10 is equal to that induced in coil 11 and, therefore, the resultant effect of these voltages is zero.

The combined impedance of the two coils 8 and 9 will vary in proportion to the current used for magnetization and flowing in coils 10 and 11, this change in impedance being due to the varying magnetic reluctance at different magnetic densities. Since the coils 10 and 11 are connected in opposition, the combined impedance of coils 8 and 9 in the alternating current circuit 7 will be uniform for the two alternations of a complete cycle of the current. It will thus be evident that the current flowing in circuit 7 can be controlled by varying the amount of current supplied to the coils 10 and 11. A rheostat 13 is shown in this figure for varying the controlling current flowing in coils 10 and 11.

One of the important applications of this method of controlling the current flowing in an alternating current circuit is in wireless telephony, in the amplification of the telephone current, and such an application of my invention is illustrated in Fig. 4. In this figure the alternator 6, preferably a high frequency machine, supplies current to the circuit 14. This circuit includes the reactance or choke coils 8 and 9 and the wireless transmitting apparatus 15. Included in series with the magnetizing coils 10 and 11 and the battery 12 is a telephone transmitter 16. The vibration of the diaphragm of the transmitter causes a variable or pulsating current to flow in the battery circuit, in the well understood manner. The degree of magnetization of the magnetic circuit of the associated coils 8 and 10, and 9 and 11 is thereby varied, thus varying the impedance of the alternating current circuit. The alternating current flowing in this circuit, and hence the output of the high frequency alternator, is, therefore, controlled by the combined impedance of the coils 8 and 9 by means of the small amount of pulsating current flowing in the coils 10 and 11. The intensity of the waves given off at the antenna 17 is thus proportional to and may be made much greater in magnitude than the telephone current.

In Figs. 1 and 2, I have shown a practical construction of the reactance coils for carrying out my novel method of control. As shown in these figures, the coils are combined in a unitary construction comprising two magnetic cores 18 and 19. These cores are composed of laminated iron or other magnetic material which is stamped in convenient shapes for assembling. In Fig. 1 each core is provided with a coil or winding 20 for carrying the controlling current, and a second and larger coil 21 for carrying the alternating current to be controlled. The coils 21 are preferably connected in series so that the current flowing therein will produce a magnetization in the same direction in both coils, while the coils 20 are connected so that the direction of magnetization produced by the current in one coil is opposite to that produced by the current in the other. It is obvious that this arrangement of connections may be reversed so that the coils 21 are magnetically in opposition, the essential requirement being that the magnetizing relation of the coils of one core is opposite in effect to the magnetizing relation of the coils of the other core.

The current produced in a telephone circuit may be considered as a pulsating current superimposed on a constant direct current. The constant direct current will of course produce a constant magnetization, while the pulsating current will produce a magnetization proportional to the magnitude and frequency of the pulsations. It is frequently desirable to increase the magnitude of the constant direct current magnetization, and I accomplish this result by the addition of a third coil which is designed to carry a constant direct current. In Fig. 2 I have illustrated this modification of my invention by the addition of the third coils 22 which are designed to carry direct current, in which the effective direction of the magnetization produced is the same as that in the corresponding coils 20. The effect of these auxiliary coils 22 is to permit an initial adjustment of the magnetization of the magnetic cores of the apparatus.

In Fig. 5 of the drawings, I have shown a modified application of my invention whereby a musical note wave may be transmitted from the antenna 14 instead of a wave of articulate speech. In this figure the controlling current is derived from an alternator 23. The alternating current circuit 14 includes the reactance coils 8 and 9, as in Fig. 4, and the transmitting apparatus 15 and antenna 17. An initial magnetization of the magnetic circuit of the coils 8 and 9 is provided by a direct current circuit including the battery 24, rheostat 25 and coils 26 and 27. The circuit of alternator 23 is completed through the coils 28 and 29. The electrical connection of the various coils is such that the magnetizing action of coil 26 upon coil 8 is opposite in effect to that of coil 27 upon coil 9, while the magnetizing action of coil 28 upon coil 8 is the same as that of coil 29 upon coil 9.

The direct current coils 26 and 27 produce a constant initial magnetization upon which is superimposed the magnetization due to the alternating current flowing in the coils 28 and 29. Since the magnetization produced by the direct current coils 26 and 27 is constant the resultant controlling magnetization of the magnetic circuit of the coils 8 and 9 will vary as the frequency of the alternating current supplied by the generator 23, and therefore, the current flowing in the alternating current circuit 14 will vary with the frequency of the controlling current, and thus a musical note wave will be sent out from the antenna. By varying the frequency of the currents generated by alternator 23, the tone of the musical note wave can be varied.

While I have described my invention with specific reference to its application to wireless telephony for amplifying the telephone current, it is obvious that the invention is in no way limited to this particular application, but is also adapted to be used wherever it is desired to control an alternating electric current.

What I claim as new and desire to secure by Letters Patent of the United States, is:—

1. An apparatus of the character described comprising a unitary structure composed of laminated magnetic material and having two cores adapted to receive windings, the magnetic circuits in the magnetic material formed thereby being partly coincident and partly separate, a winding for said cores supplied by a source of high frequency alternating current and a second magnetizing winding for said cores supplied by a source of direct current, the two windings being so related to each other and to the magnetic cores that high frequency alternating currents will not flow in the circuit supplying the direct current winding.

2. An apparatus of the character described comprising a unitary structure composed of laminated magnetic material and having two cores adapted to receive windings, the magnetic circuits in the magnetic material formed thereby being partly coincident and partly separate, a winding for each of said cores supplied by a source of high frequency alternating current and a second magnetizing winding for each of said cores supplied by a source of direct current, the windings being so related to each other and to said cores that the electromotive forces induced in the direct current windings of the two cores by the high frequency alternating current are substantially equal and opposite.

3. An apparatus of the character described comprising a unitary structure of laminated iron and having two cores adapted to receive windings, the magnetic circuits in the magnetic material formed thereby being partly coincident and partly separate, a winding for said cores supplied by a source of high frequency alternating current, a second magnetizing winding for said cores supplied by a constant source of direct current and a third winding for said cores supplied by a variable current, the windings being so related to one another and to the cores that high frequency alternating currents will not flow in the circuit supplying the direct current winding.

4. An apparatus of the character described comprising a unitary structure of laminated iron and having two cores adapted to receive windings, the magnetic circuits in the magnetic material formed thereby being partly coincident and partly separate, a winding for each of said cores supplied by a source of high frequency alternating current, a second magnetizing winding for each of said cores supplied by a constant source of direct current and a third winding for each of said cores supplied by a variable current, the windings being so related to one another and to the cores that the electromotive forces induced in the direct current windings of the two cores by the high frequency alternating current are substantially equal and opposite.

5. An apparatus of the character described comprising a unitary structure composed of laminated magnetic material and having a plurality of cores adapted to receive windings, the magnetic circuits in the magnetic material formed thereby being partly coincident and partly separate, a winding for said cores supplied by a source of high frequency alternating current, and a second magnetizing winding for said cores supplied by a source of direct current, the two windings being so related to each other and to the cores that high frequency alternating currents will not flow in the circuit supplying the direct current winding.

6. An apparatus of the character described comprising a unitary structure composed of laminated magnetic material and having a plurality of cores adapted to receive windings, the magnetic circuits in the magnetic material formed thereby being partly coincident and partly separate, a winding for said cores supplied by a source of high frequency alternating current, a second magnetizing winding for said cores supplied by a constant source of direct current and a third winding for said cores supplied by a variable current, the windings being so related to one another and to the cores that high frequency alternating currents will not flow in the circuit supplying the direct current winding.

7. An apparatus of the character described comprising a unitary structure composed of laminated magnetic material and having two cores adapted to receive windings, the magnetic circuits formed thereby in the magnetic material being partly coincident and partly separate, a winding for each of said cores supplied by a source of high frequency alternating current, a second magnetizing winding for each of said cores supplied by a constant source of direct current, and a third magnetizing winding for each of said cores supplied by a source of alternating current having a frequency corresponding to that of a musical note, the windings being so related to each other and to the cores that high frequency alternating currents will not flow in the circuits supplying the magnetizing windings.

In witness whereof, I have hereunto set my hand this 5th day of December, 1912.

ERNST F. W. ALEXANDERSON.

Witnesses:
 BENJAMIN B. HULL,
 HELEN ORFORD.